Figure 1:
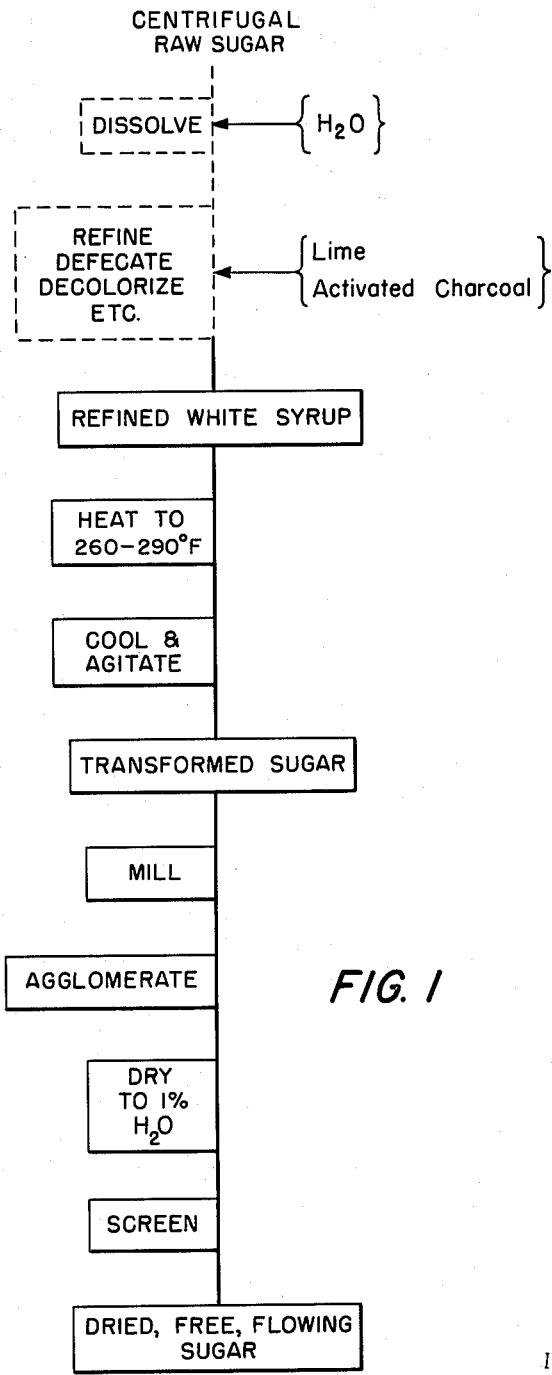

June 21, 1966     F. W. SCHWER ETAL     3,257,236
METHOD OF MAKING SUGAR
Filed July 7, 1964     3 Sheets-Sheet 1

INVENTORS.
FREDERICK W. SCHWER &
GEORGE S. BAILEY, JR.
BY
their ATTORNEYS

June 21, 1966 F. W. SCHWER ETAL 3,257,236
METHOD OF MAKING SUGAR

Filed July 7, 1964 3 Sheets-Sheet 3

INVENTORS.
FREDERICK W. SCHWER &
GEORGE S. BAILEY, JR.
BY their ATTORNEYS

United States Patent Office 3,257,236
Patented June 21, 1966

3,257,236
METHOD OF MAKING SUGAR
Frederick W. Schwer, Strafford-Wayne, Pa., and George S. Bailey, Jr., Maple Shade, N.J., assignors to The National Sugar Refining Company, New York, N.Y., a corporation of New Jersey
Filed July 7, 1964, Ser. No. 380,811
7 Claims. (Cl. 127—61)

This application relates to an improved method for making a granulated sugar.

The largest single commercial source of sugar is sugar cane grown commercially both in this country and in many foreign countries. In the recovery of sugar from sugar cane, the sugar cane is crushed and extracted with water to recover as much of the soluble sugars as can be obtained. The extract, however, contains many impurities. In order to render it fit for human consumption, it is purified to a high degree of purity. As a result, the table sugar purchased in the stores is one of the purest food products available.

The first step in the recovery of sugar from sugar cane is to convert the cane to a raw centrifugal sugar. To this end, the sugar cane is crushed and extracted with water. The cane juice, thereby recovered, is strained to remove fine particles of bagasse (e.g., the pulp of the sugar cane) and it is then clarified or defecated. This generally consists of a combination of heating, treatment with lime and filtering. The clear juice obtained from the defecation step is evaporated to a syrup and crystallized in vacuum pans. Normally, the vacuum crystallization of the clarified juice of the sugar cane extract will be carried out in several steps (i.e., three or four crops of sugar will be recovered from each batch of juice) in order to obtain the most complete recovery of crystallizable sugar.

The crystallized sugar recovered from the vacuum crystallizers is centrifuged, and the centrifugal sugar thus recovered is known in the trade as "centrifugal raw sugar." Centrifugal sugars normally contain about 1% moisture, a small amount of insoluble materials and about 0.5% ash. The sucrose content of such sugars will range from 85% to about 99%, with a purity of around 97% being most common.

Normally, the foregoing steps are carried out in locations convenient to the sugar cane fields, and the centrifugal sugar, as just described, is shipped to sugar refineries in this country where further purification is carried out.

The refining of centrifugal sugar is an old art. Although there have been many proposals for improving the efficiency and effectiveness of the refining process, there have been few substantial changes in sugar refining since the early part of this century. In broadest outline, the refining steps applied to the centrifugal sugar are essentially the same as the refining steps which were first applied to the cane juice.

The centrifugal raw sugar is first washed to remove a substantial portion of the molasses that surrounds the crystals of the raw sugar. Thereafter, the crystalline sugar is dissolved in water.

The dissolved sugar is defecated, i.e., neutralized with lime and filtered. The effluent from the defecation step is crystal clear, but has a strong yellow color since few materials other than insolubles are removed at this point.

The next major step in the purification process is decolorizing the clear liquor. One of the most widely employed commercial techniques is the use of activated charcoal. However, other techniques, particularly, decolorizing with hypochlorites and ion exchange resins are known and have been commercially used, these being of relatively recent origin.

The last step is then the recovery of high purity sugar suitable for human consumption by crystallization. The clarified and decolorized liquor is evaporated to a syrup, and crystallized sugar is recovered from the syrup by vacuum crystallization.

Typically, three or four crops of sugar will be recovered from the concentrated syrup. The mother liquor recovered from the early stages will contain significant amounts of recoverable sugar. As successive crops of sugar are removed, the impurities remaining, as well as degradation products resulting from the various heating steps, become concentrated in the mother liquor. As a result, the mother liquor becomes increasingly dark in color.

The syrup from the last stage of crystallization is too dark for the practical recovery of further white sugars. This material may be partially decolorized by additional charcoal treatment. The partially decolorized liquor is used in the production of soft or brown sugars which are prepared in the same manner as white sugars are prepared, that is, by successive vacuum crystallization. The crystallized brown sugars recovered are centrifuged to remove all but about 2%–3% moisture, and sold without further purification or drying, as "soft sugars."

Brown sugars are basically crystals of pure sucrose. However, the individual crystals are coated with the molasses which is not removed by centrifuging. This molasses, which clings to the crystallized sugar, gives brown sugar its characteristic flavor and color.

The syrup spun off from the final stage of crystallization is known as refiners' blackstrap. It is very dark in color and somewhat bitter in flavor. Although this syrup contains significant amounts of sugar, these sugars are for all practical purposes lost to the refiner and are an economic waste.

For a fuller description of the manufacture of sugar as outlined above, reference may be had to the Encyclopedia of Chemical Technology, volume 13, pages 203–216.

An alternate method for converting raw centrifugal sugar is to use what is known as the transforming process. The transforming process has also been known for many years. However, it has not enjoyed commercial success. In transforming syrup into a sugar, the clarified concentrated syrup which has been prepared by the refining of raw centrifugal sugar, as described in detail above, is further concentrated to about 93% solids or higher. This is achieved by boiling the refined syrup at atmospheric pressure until a temperature of about 260°–290° F. is reached. Thereupon, the syrup is allowed to cool. As the concentrated syrup cools, crystallization will commence. The temperature at which crystallization commences is referred to hereinafter as the "transformation temperature" and is a function of the concentration of the syrup as well as the purity of the sugar in that syrup.

As the syrup reaches the transformation temperature, and crystallization commences, a substantial amount of heat of crystallization is given off. This heat is sufficient to cause the evaporation of most of the water remaining in the syrup. Thus, the syrup in the transforming process is concentrated to about 93% and the transformed sugar obtained from that syrup will contain less than 1% moisture.

In order to obtain a granulated sugar from the transforming process, it is necessary in addition to agitate the syrup strongly as it is cooling. This may be accomplished in a wide variety of equipment. This agitation, known as graining, breaks up the sugar as it crystallizes and leads to the formation of sugar particles of desired sizes.

Still another important factor in the transforming process is that the cooling step must not be carried out too rapidly. In practical processes, the syrup will be cooled at a rate of perhaps 1° to 10° F. per minute. If the syrup is cooled too rapidly the sugar will be converted to a glass rather than to a granular product.

The transformed sugar contains all of the solids of the original syrup, including the non-sugar solids. The individual grains of transformed sugar are clusters or agglomerates of microscopic crystals of sucrose with the non-sugar solids (i.e. impurities) being mostly in the interstitial spaces between the sucrose crystals forming the agglomerates. This structure is distinctly different from the structure of crystallized sugars in which the grain has a characteristic crystalline structure. Impurities in crystallized sugars are mostly in the form of a coating on each individual crystal, i.e., the molasses coating mentioned above which characterizes crystallized brown sugars.

The transforming process has obvious advantages from the economic standpoint. In this process, all of the solids in the syrup are converted into granular sugar, and there is no waste molasses produced. Moreover, the equipment required is simple and relatively inexpensive. By contrast, extensive vacuum pans are required for a commercial crystallization process. In part, the reason for this is that the crystallization process, as currently practiced, is relatively slow. Typically, the time required to recover sugar from the refined syrup entering the vacuum evaporators will be from 8 to 12 hours. By contrast, syrup may be converted to a granular sugar by the transformation process in a matter of an hour or less.

Despite the obvious economic advantages of the transforming process, it has not been commercially successful and is now abandoned. One reason for this is that the particle size of the granular sugar produced by transforming cannot be closely controlled. Transformed sugar may contain particles ranging in size from a ½ inch lump to material which will pass through a 10 mesh screen.

A more important drawback to transformed sugars is that they are not commercially acceptable because of their poor storage characteristics. As mentioned above, the transformed sugar will contain all of the impurities which are present in the refined syrup. Although the proportions of these impurities are small, i.e. a fraction of a percent in the case of white sugars, they are sufficient to impart a significant hygroscopicity to the sugar product. Thus, even though the sugar, as produced, contains less than 1% moisture, if stored under normal atmospheric conditions it will absorb a sufficient amount of moisture to cause the sugar to become tacky and lumpy. If such sugar is stored for any length of time, particularly in large quantities, it becomes a hard, rocklike cake which can be broken up only with the greatest difficulty.

According to the present invention, a method has been found for overcoming these and other deficiencies of the transforming process so that it is now rendered suitable for recovering commercially acceptable white or brown sugars. In the method of the present invention, sugar is prepared by the following steps:

(1) A sugar syrup in which the solids are at least 85% sucrose is concentrated to a solids content of over 93%, and maintained at a temperature sufficiently high to prevent solidification. Typically, this is done by boiling the syrup in a kettle at atmospheric pressure until a temperature of 260°–290° F. is reached. Vacuum concentrators as well as other types of concentrators may be employed.

(2) The hot syrup is cooled at a rate of not more than 10° per minute until a transformed sugar is obtained having a moisture content of not more than about 1%.

(3) The transformed sugar thus obtained is milled, until at least about 5% of the milled product passes through a 65 mesh screen. Preferably, the portion of the milled sugar passing through a 14 mesh screen is recovered.

(4) The milled transformed sugar is agglomerated by agitating it in the presence of sufficient moisture to raise the moisture content of the sugar to about 4% to 5%.

(5) The agglomerated sugar is dried to below about 1% moisture. For household sugars, the fraction of the agglomerate having a particle size between about 14 mesh and about 65 mesh is usually recovered.

It will be recognized that steps (1) and (2) above constitute the conventional transforming process as that process has been known for many years. In the foregoing process, the conventional transforming method has been combined with the steps of milling and agglomerating. These latter steps result in a transformed sugar product which is acceptably uniform in size, and which will remain free-flowing and non-caking even though it is stored for substantial periods of time.

The improvement in storage characteristics of the transformed sugars is obtained whether brown or white sugars are produced. While crystallized white sugars of good storage characteristics have been known for a long time, as mentioned above, transformed white sugars have not heretofore exhibited comparable storage properties. Transformed white sugars prepared in accordance with the present invention may be stored under the same conditions under which crystallized white sugars are normally stored and will retain a free-flowing property which is as good as or better than the properties of conventional crystallized white sugars.

Crystallized brown sugars have long been known for their propensity to cake on storage. This is due to the fact that the molasses surrounding the crystalline sucrose of brown sugars causes the sugar crystals to bond together, particularly, as that molasses tends to lose water on standing. Transformed brown sugars in accordance with this present invention, by contrast, maintain free-flowing properties which are equal to the transformed white sugars and crystallized white sugars mentioned above. Moreover, the storage characteristics of brown sugars prepared in accordance with the present invention, especially when following the preferred embodiments thereof, are substantially superior to the storage characteristics of even the so-called "free-flowing" brown sugars.

If white sugars are to be obtained by the process of the present invention, the syrup must be decolorized before it is transformed, and have a purity of over 99%. If brown sugars are to be produced, the syrup will not be completely decolorized and will typically have a purity of 92%–93%.

Figure 2:
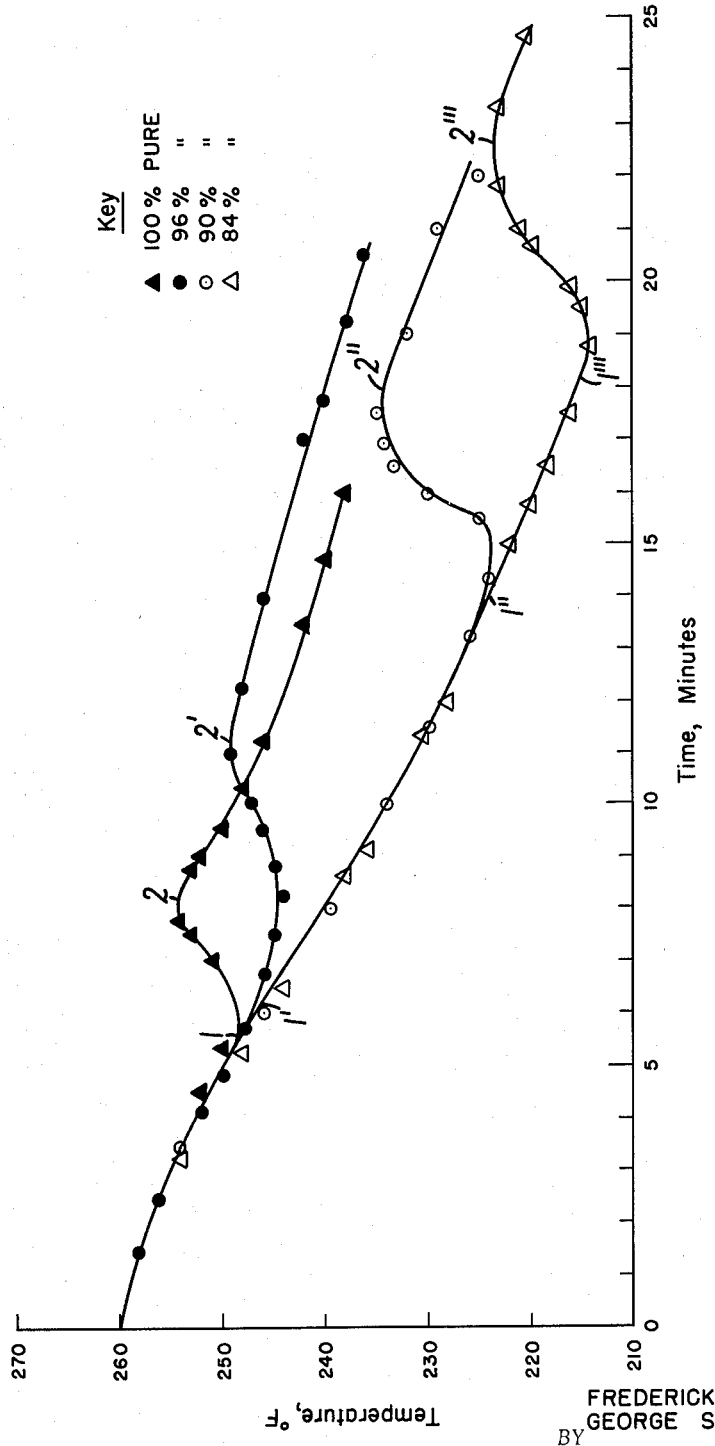
Figure 3:
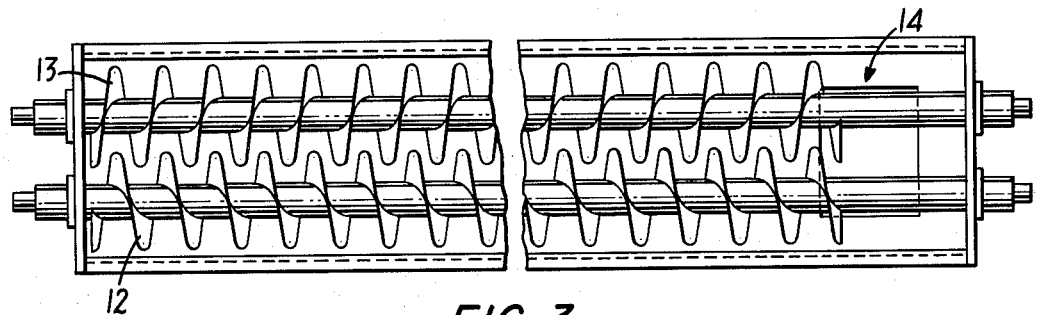
Figure 4:
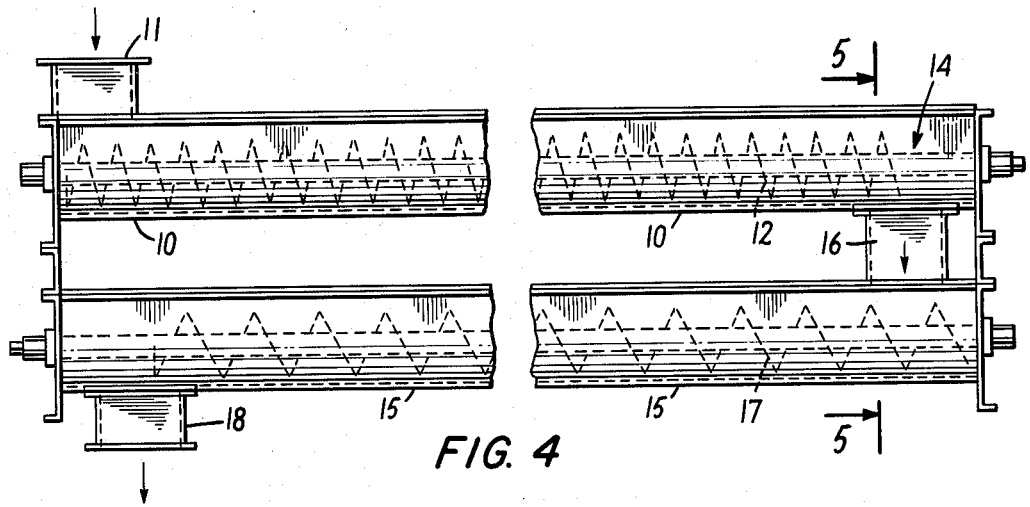
Figure 5:
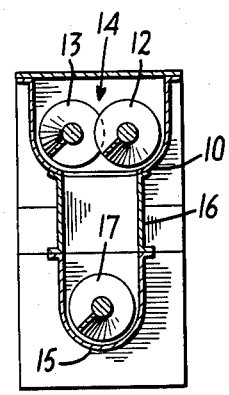

For a further understanding of this invention, reference may be had to the following description and to the figures, in which FIGURE 1 shows a schematic flow diagram of the process of the present invention;

FIGURE 2 shows the time-temperature history of typical transformation processes; and FIGURES 3 to 5 show a top, side and sectional end view of a continuous transforming apparatus particularly adapted for the practice of the present invention.

As mentioned, FIGURE 1 shows a schematic flow diagram of the process of this invention. This diagram follows the process as already outlined above. For greater clarity, the diagram also indicates the relationship of the process of this invention to the refining steps required to prepare a suitable syrup from centrifugal raw sugar.

To concentrate the syrup to at least 93% solids, which is required for successful transformation, any convenient concentrating equipment may be employed. In the simplest process, an open kettle is satisfactory. However, it will be recognized that many types of equipment have been proposed and would be useful in carrying out the concentration step.

Care must be taken during the concentrating step to avoid or minimize caramelization of the syrup. If a simple kettle is employed, for instance, agitation during boiling should be provided.

Normally, the syrup will have to be heated to a temperature of about 260°–290° F. in order to concentrate it sufficiently. In the preferred embodiments of this invention, the temperature of the boiling, concentrated syrup will be about 265°–275° F. However, the temperature required to concentrate the sugar is a function of the purity of the syrup. If lower purity syrups are employed, higher temperatures will be required.

After the syrup has been sufficiently concentrated, it is transformed by allowing it to cool. As mentioned above, the cooling syrup should be subjected to heavy agitation or graining in order to encourage the formation of a granular product.

As the syrup cools, it will reach the transformation temperature, at which temperature crystallization will commence. The crystallization proceeds rapidly and liberates a sufficient amount of heat to result in the evaporation of substantially all of the remaining water of the syrup. Typically, transformed sugars will contain less than 1% water.

The transformation process and the effect of sugar purity on the transformation temperature is illustrated in Example 1.

Example 1

Four batches of 1,000 grams each of sugars having purities between 84% and 100% were dissolved in sufficient water to make a syrup containing 65% solids. Each batch was heated with constant stirring until it reached a temperature of 260° F. Heating was then stopped; however, agitation was continued at the same fixed rates. The time-temperature history of each batch was observed during cooling. These data are set forth in FIGURE 2. In each case a granular solid sugar was obtained.

By reference to FIGURE 2 it will be seen that the syrup cools to the transformation temperature (points 1, 1′, 1″, 1‴). Crystallization begins at these points. As mentioned previously, the transformation temperature is a function of the purity of the syrup. In FIGURE 2 the transformation temperatures of the higher purity syrups, e.g. points 1 and 1′ are higher than the transformation temperatures of the lower purity syrups points 1″ and 1‴.

The crystallization of sugar, once it has begun, proceeds with sufficient speed to cause a noticeable increase in the temperature of the crystallizing mass. Thus, once the transformation temperature is reached (points 1 through 1‴) the temperature rises to points 2, 2′, 2″ and 2‴.

It will be observed that after the temperature has reached points 2 through 2‴, the temperature of the transformed sugar resumes its normal descent. For this reason, it is believed that the transformation process is substantially complete by the time the temperature has reached points 2–2‴.

Various equipment may be employed during the cooling step of the transformation process. If simple kettles are employed for heating the sugar, as suggested above, it is convenient to provide agitators in such a kettle. The agitators employed to prevent scorching of the syrup during boiling are, typically, sufficient for this purpose.

A particularly preferred type of transforming apparatus is a plurality of interleaved screws as illustrated in FIGURES 3–5. Referring to these figures, concentrated syrup at 260°–290° F. enters a trough 10 through a port 11. A pair of screws 12 and 13 are mounted in trough 10 for advancing and mixing the hot syrup as it cools. These screws are, respectively, right-handed and left-handed. Rotation of the screws is counter-clockwise with respect to each other, so that the screws advance the cooling syrup toward the far end 14 of trough 10.

As the syrup is carried along trough 10 by the screws 12 and 13 it cools and it is simultaneously subjected to heavy agitation. Air cooling is usually sufficient, since rapid cooling is not needed or desired. However, a water-cooled jacket for trough 10 may be provided if desired. At the far end 14, the cooling mass will drop from the upper trough 10 to a lower trough 15 via passage 16. Another screw 17 is mounted in trough 15 to advance the cooling mass to the discharge port 18, from whence the transformed sugar product is withdrawn.

In the operation of this transformer, cooling is usually sufficiently rapid that the transformation temperature is reached in the mid-portion of the upper trough 10. The interleaved screws 12 and 13 in the upper trough 10 provide the heavy agitation required during transformation. Thus, the product falling into lower trough 15 is essentially dry, transformed sugar. However, it has been found that, for best results, the additional cooling and drying provided by screw 17 is desirable.

The next step of the process is to mill the transformed sugar until at least about 5% passes through a 65 mesh screen. Preferably, the portion passing through a 14 mesh screen is recovered because this particle size is most desired in the final product. Milling of the transformed sugar to close tolerances or to a fine powder is not required. To provide sufficient fines for the operation of the agglomerator in the next step, however, at least about 5% of the milled sugar recovered from this step should pass through a 65 mesh screen. The sugar may, if desired, be milled to a fine powder; however, this is not preferred because it is wasteful to mill the sugar more than is required. Milling equipment may be any which is commercially available. Exemplary of two commercially available pulverizing mills which have been found to be satisfactory are the Rietz Disintegrator model RP or RA and the Entoleter, series 14 or 27.

The milled product is then agglomerated in the presence of moisture. The moisture may be supplied either as a fine mist of water or by providing an atmosphere containing wet steam. During the agglomeration, sufficient water is provided to raise the moisture content of the transformed sugar to about 4% to 5% by weight. Larger amounts of water should not be employed since it will convert the sugar into a soggy mass which cannot be effectively agglomerated.

Agglomeration is carried out by causing the moistened sugar particles to impinge upon each other. A simple agitated kettle may be employed for this purpose, although normally it is not the most effective means of agglomerating. A Patterson-Kelly Blender is another device providing the necessary agitation and impingement of the milled sugar particles with each other during the agglomeration step, and it has been successfully employed in the practice of this invention. The Patterson-Kelly Blender as is well-known, is formed from a pair of angularly oriented cylinders which are joined with each other in a V shape.

The foregoing methods of agglomerating have the disadvantage that irregularly shaped particles are produced. Moreover, they produce products of a generally lighter bulk density than ordinary brown sugar. As a result, the housewife is compelled to use larger amounts (in terms of volume measure) than she is accustomed to using.

We have found that a particularly effective and advantageous means of agglomerating the milled sugar is to allow the milled sugar particles to fall down an inclined surface. As they fall down this surface, they "snowball" with each other. A product results which has the shape of spherical or rounded pellets. It has been found that the spherically shaped particles have particularly long storage life, and high resistance to caking. In addition, the density of the agglomerated product is high enough that the housewife can use the amounts to which she is accustomed.

In employing this type of agglomerator, we have found, moreover, that the use of wet steam is generally preferred to obtain efficient agglomeration. Although in other types of agglomerators, a water mist or spray may be satisfactorily used, when employing an inclined surface type of agglomerator, less satisfactory results are obtained if a water spray is employed to moisten the milled sugar product. The wet steam atmosphere is provided on the upper portions of the inclined surface so that the milled sugar powder passes through it, and becomes moistened while it is falling down the surface.

A Dravo-Lurgi pelletizer or balling pan is particularly satisfactory for this preferred process. The Dravo-Lurgi equipment is characterized by an inclined rotating disk. Because of the rotating action of the pelletizer, it has a classifying effect, and produces, therefore, a product of a controlled particle size.

As mentioned, the agglomerated product is dried, and for this purpose, any suitable drying equipment may be employed. For commercial purposes, it is normally desired to take that fraction of the dried product which has a particle size between about 14 mesh and about 65 mesh. Oversized particles are recycled to the milling step, while undersized particles are returned to the agglomerating equipment.

Where agglomerating equipment which does not produce a rounded particle, such as the Patterson-Kelly Blender mentioned above, is employed, the use of a heated rotating pan, such as is commonly employed in candy making, is a particularly desirable method of drying the agglomerated product. The reason for this is that the rotating pan type of drier tumbles the agglomerated particles during drying and contributes to a spheroidal shape of the dried particle.

For a further understanding of this invention, reference may be had to the following examples illustrating each of the various steps.

*Example 2*

A saturated syrup was pumped through a model 372 continuous concentrator manufactured by the Groen Manufacturing Company. Steam at a pressure of 75–100 p.s.i. was employed as the heating medium. Such steam has a condensation temperature of about 320°–340° F. The flow of syrup was regulated to give a concentrated effluent which boiled at about 265°–270° F. The effluent had a solids content of somewhat over 93%. 75 lbs. per hr. of starting syrup yielded about 53 lbs. per hr. of cooked syrup.

*Example 3*

The cooked syrup obtained in Example 2 was transferred to a 10 qt. round bottom vessel equipped with two sets of stirring arms which revolved in opposite directions. Stirring was maintained for about 10 minutes during which time transformation and graining occurred releasing the latent heat of crystallization and which in turn vaporized most of the remaining water. A hot, dry product was obtained which ranged in particle size from a powder to aggregates of ½ in. diameter and had a moisture content of less than 1%. A screen analysis of the transformed sugar was as follows:

| | Percent |
|---|---|
| On 6 mesh | 6.2 |
| On 10 mesh | 12.5 |
| Through 10 mesh | 81.3 |

(A Tyler screen series was used in this analysis, as well as in all other screen analyses referred to in this application.)

*Example 4*

The cooked syrup obtained in Example 2 was cooled in a continuous agitator having a set of two interleaved scrolls placed parallel to each other. The scrolls were rotated in opposite directions, and were pitched oppositely to each other so that the flow of material was in one direction only. This apparatus is illustrated in FIGURES 3–5. About 10 minutes were required to cool the syrup and to transform it to a powdered sugar. A hot, dry product was obtained which had a moisture content of less than 1%. A screen analysis of this product was as follows:

| | Percent |
|---|---|
| On 6 mesh | 0 |
| On 10 mesh | 60 |
| Through 10 mesh | 40 |

*Example 5*

The transformed sugars obtained in Examples 3 and 4 were milled in a Rietz Disintegrator. Milling was continued until a product of the following particle size distribution was obtained:

| | Percent |
|---|---|
| On 14 mesh | 0 |
| On 20 mesh | 8.6 |
| On 28 mesh | 3.4 |
| On 35 mesh | 9.7 |
| On 48 mesh | 14.6 |
| On 65 mesh | 18.5 |
| On 100 mesh | 18.2 |
| Through 100 mesh | 27.0 |

There was no significant difference in the milling of the transformed sugars obtained in Examples 3 and 4.

*Example 6*

Example 5 was repeated, except that the transformed sugars of Examples 3 and 4 were milled with an Entoleter. The milled product had the following particle size analysis:

| | Percent |
|---|---|
| On 20 mesh | 0 |
| On 28 mesh | 3.8 |
| On 35 mesh | 4.2 |
| On 48 mesh | 7.0 |
| On 65 mesh | 9.5 |
| On 100 mesh | 11.4 |
| Through 100 mesh | 64.1 |

*Example 7*

The milled product of Example 5 was screened to obtain a material passing through a 28 mesh screen. During this screening some attrition of the milled product occurred resulting in a screened material having a larger percentage of through 100 mesh fines. The screen analysis of this material was as follows:

| | Percent |
|---|---|
| On 20 mesh | 0 |
| On 28 mesh | 0.1 |
| On 35 mesh | 8.2 |
| On 48 mesh | 12.0 |
| On 65 mesh | 15.1 |
| On 100 mesh | 17.4 |
| Through 100 mesh | 47.2 |

This feed material was agglomerated in a Dravo-Lurgi pelletizer in which the rotating circular pan was set at an angle of about 45°. A jet of wet steam was directed over the surface of the rotating pan.

An agglomerated sugar was obtained having a moisture content between about 4% and 5%, the individual particles of which were spherically shaped. The agglomerated product had the following screen analysis:

| | Percent |
|---|---|
| On 20 mesh | 45 |
| On 28 mesh | 32.9 |
| On 35 mesh | 13.8 |
| On 48 mesh | 4.5 |
| On 65 mesh | 1.9 |
| On 100 mesh | 0.8 |
| Through 100 mesh | 0.7 |

The agglomerated product was dried with a current of warm air to a moisture content of less than 1%, and screened to recover the material between 14 mesh and 65 mesh.

The foregoing Examples 2, 4, 5 and 7 are consecutively combined in the preferred embodiment of this invention.

We claim:
1. A process for manufacturing a dry granular sugar comprising the steps of
   (1) preparing a syrup of sugar in which the solids are at least about 85% sucrose based on the weight of the dry solids,
   (2) concentrating said syrup to a solids content of at least about 93% and maintaining said syrup at a temperature sufficient to prevent solidification thereof,
   (3) cooling said syrup at a rate not more than about 10° per minute and, during said cooling step, agitating said syrup until it is cooled to below its transformation temperature, whereby a crude granular sugar product is obtained,
   (4) milling said crude granular product until at least about 5% of the sugar passes through a 65 mesh screen,
   (5) agglomerating the milled crude granular product in the presence of sufficient moisture to raise the water content of the solids to about 4% to about 5% by weight, and
   (6) drying the agglomerated product to less than 1% moisture.

2. A process according to claim 1, wherein the solids in said syrup are at least about 99% sucrose and wherein said syrup has been decolorized.

3. A process according to claim 1, wherein said syrup is boiled at atmospheric pressure until it reaches a temperature of about 260°–290° F.

4. A process according to claim 3, wherein said syrup is boiled until it reaches a temperature of about 265°–275° F.

5. A process for manufacturing a dry granular sugar comprising the steps of
   (1) preparing a syrup of sugar in which the solids are at least about 85% sucrose based on the weight of the dry solids,
   (2) concentrating said syrup to a solids content of at least about 93% and maintaining said syrup at a temperature sufficient to prevent solidification thereof,
   (3) cooling said syrup at a rate not more than about 10° per minute and, during said cooling step, agitating said syrup until it is cooled to below its transformation temperature, whereby a crude granular sugar product is obtained,
   (4) milling said crude granular product until at least about 5% of the milled sugar passes through a 65 mesh screen, and recovering milled sugar passing through a 14 mesh screen,
   (5) discharging the milled crude granular product thus recovered at the top of a surface inclined sufficiently from the horizontal that the milled product will fall downwardly on said surface and providing for sufficient moisture adjacent the inclined surface to raise the water content of the milled sugar falling down the surface to about 4% to 5% by weight, whereby an agglomerated sugar product is obtained, the individual particles of which are spherically shaped, and
   (6) drying the agglomerated product to less than 1% moisture.

6. A process according to claim 5, wherein a jet of wet steam is directed at said surface to raise the moisture content of said solids to about 4% to 5%.

7. A process for manufacturing a dry granular sugar comprising the steps of
   (1) preparing a syrup of sugar in which the solids are at least about 85% sucrose based on the weight of the dry solids,
   (2) concentrating said syrup to a solids content of at least about 93% and maintaining said syrup at a temperature sufficient to prevent solidification thereof,
   (3) cooling said syrup at a rate not more than about 10° per minute in a cooler having a pair of interleaved screws for agitating said syrup as it advances through said cooler, and continuing said cooling until said syrup is cooled to below its transformation temperature whereby a crude granular sugar product is obtained,
   (4) milling said crude granular product until at least about 5% of the milled product passes through a 65 mesh screen, and recovering the milled sugar passing through a 14 mesh screen,
   (5) agglomerating the milled crude granular product in the presence of sufficient moisture to raise the water content of the solids to about 4% to about 5% by weight, and
   (6) drying the agglomerated product to less than 1% moisture.

References Cited by the Examiner

UNITED STATES PATENTS

| | | | |
|---|---|---|---|
| 2,995,773 | 8/1961 | Gidlow et al. | 127—63 X |
| 3,143,428 | 8/1964 | Reimers et al. | 99—141 |
| 3,194,682 | 7/1965 | Tippens et al. | 127—61 X |

MORRIS O. WOLK, *Primary Examiner.*

M. E. ROGERS, *Assistant Examiner.*